US012776098B2

(12) United States Patent
Wang et al.

(10) Patent No.: US 12,776,098 B2

(45) Date of Patent: Oct. 27, 2026

(54) DATA PROCESSING METHOD, A SYSTEM, A MEDIUM, AND A COMPUTER PROGRAM PRODUCT

(71) Applicant: Shanghai Lilith Technology Corporation, Shanghai (CN)

(72) Inventors: Yinpeng Wang, Shanghai (CN); Yongjian Wang, Shanghai (CN)

(73) Assignee: Shanghai Lilith Technology Corporation, Shanghai (CN)

( * ) Notice: Subject to any disclaimer, the term of this patent is extended or adjusted under 35 U.S.C. 154(b) by 140 days.

(21) Appl. No.: 18/728,607

(22) PCT Filed: Jan. 14, 2022

(86) PCT No.: PCT/CN2022/072020

§ 371 (c)(1),
(2) Date: Jul. 12, 2024

(87) PCT Pub. No.: WO2023/133801

PCT Pub. Date: Jul. 20, 2023

(65) Prior Publication Data

US 2025/0118017 A1 Apr. 10, 2025

(51) Int. Cl.
*G06T 17/00* (2006.01)

(52) U.S. Cl.
CPC .................................... *G06T 17/00* (2013.01)

(58) Field of Classification Search
CPC .......... A63F 13/77; A63F 13/352; G06F 3/01; G06F 3/0481; G06T 17/00
See application file for complete search history.

(56) References Cited

U.S. PATENT DOCUMENTS 8,869,044 B2 * 10/2014 Silbey .................... G06Q 10/00 715/753
2018/0165914 A1 * 6/2018 Sternberg ............ G07F 17/3225

FOREIGN PATENT DOCUMENTS

CN 105892650 A * 8/2016 ........... G06T 19/006

* cited by examiner

*Primary Examiner* — Kee M Tung
*Assistant Examiner* — Thang Gia Huynh
(74) *Attorney, Agent, or Firm* — Taft Stettinius & Hollister LLP

(57) ABSTRACT

The invention relates to the technical field of computer data processing, and relates in particular to a virtual scene-oriented data processing method, a system, a medium, and a computer program product. The data processing method comprises: a determination step: determining whether a transfer request for transferring at least one virtual character from a first virtual scene to a second virtual scene has been received; a generation step: when the transfer request is received, generating transmission data associated with the virtual character; a transfer step: transferring the virtual character from the first virtual scene to the second virtual scene on the basis of the transmission data and global data associated with the virtual character. By means matching the global data and the transmission data, the virtual character being transferred from the first virtual scene to the second virtual scene is supported, relevant data information when interacting in the first virtual scene is retained, and mutual data sharing is implemented.

7 Claims, 3 Drawing Sheets

DATA PROCESSING METHOD, A SYSTEM, A MEDIUM, AND A COMPUTER PROGRAM PRODUCT

CROSS-REFERENCE TO RELATED APPLICATIONS

This application is a U.S. National Phase of International PCT Application No. PCT/CN2022/072020, which was filed on Jan. 14, 2022, the contents of which are incorporated herein by reference in their entirety.

TECHNICAL FIELD

The present invention relates to the technical field of computer data processing, and relates in particular to a virtual scene-oriented data processing method, a system, a medium, and a computer program product.

BACKGROUND

With the development of computer technology, especially application programs that support virtual scenes are becoming more and more common. Users can interact with virtual scenes through user devices, complete model design and other work, and can also socialize, relax, and play games. In the near future, it will even be possible to realize a virtual world based on virtual scenes, that is, the metaverse world, allowing users to carry out activities such as learning, working, living and entertainment in the virtual world.

When users interact with virtual scenes, they often need to jump from one virtual scene to another, such as jumping from an architectural modeling scene to a mechanical equipment modeling scene, or jumping between different game virtual scenes. The existing technical solution requires the user to exit from the first virtual scene, return to the so-called game platform lobby, and then enter the second virtual scene, and the relevant data previously interacted in the first virtual scene cannot be directly migrated to the second virtual scene, causing obstacles to the interconnection and sharing of data. Specifically, the user controls the virtual character in the first game virtual scene to perform mining activities, which increases the number of gold coins. If the user wants to enter the store in the second game virtual scene for consumption, he/she must perform logout and login operations, that is, first exit from the first game virtual scene, return to the game platform lobby, and then enter the second game virtual scene, and after the user enters the second game virtual scene, the number of gold coins previously added in the first game virtual scene is not recorded in the second game virtual scene. Such data barriers need to be cleared.

Therefore, there is an urgent need for a data processing solution for virtual scenes that can break down data transmission and sharing barriers between different virtual scenes, and can also supports one-click jump of user-controlled virtual characters between different virtual scenes.

SUMMARY

The object of this invention is to provide a data processing method, a system, a medium, and a computer program product that support the convenient transfer of user-controlled virtual characters between different virtual scenes, and retain relevant data information during the transfer process.

An embodiment of the invention discloses a data processing method applied to a application program that provide human-computer interaction based on virtual scenes, the data processing method includes:

- a determination step: determining whether a transfer request for transferring at least one virtual character from a first virtual scene to a second virtual scene has been received;
- a generation step: when the transfer request is received, generating transmission data associated with the virtual character;
- a transfer step: transferring the virtual character from the first virtual scene to the second virtual scene on the basis of the transmission data and global data associated with the virtual character.

Preferably, the application program includes at least one subprogram, the subprogram includes at least one virtual scene, and the first virtual scene and the second virtual scene belong to the same or different subprograms.

Preferably, the subprogram runs the human-computer interaction function carrying the virtual scene through logical groups, and each logical group is bound to a unique logical group serial number, one or more virtual characters in the same logical group realize human-computer interaction according to the functional logic of the subprogram.

Preferably, the number of logical groups is set according to the number of virtual characters required to be carried by each virtual scene; The above transfer step further include: matching logical groups for the virtual characters transferred to the second virtual scene according to matching rules.

Preferably, the global data is stored in a long-term storage server, and the global data includes at least one of model information, level information, and equipment information of the above-mentioned virtual character; the virtual character generates subprogram data when realizing human-computer interaction in the virtual scene, the subprogram data is stored in the application server, the subprogram data includes at least one of the position parameters and motion posture parameters of the virtual character; the transmission data is generated by the jump server after extracting subprogram data required for transfer from the application server corresponding to the above-mentioned first virtual scene and processing it, to support the transfer of the virtual character from the first virtual scene to the above-mentioned second virtual scene.

Furthermore, the above-mentioned global data is visible to all application servers and supports reading and writing; the above-mentioned subprogram data is only visible to the associated application server, is generated when the virtual character logs in or transfers into the application server, and is destroyed when the virtual character logs out or transfers out of the application server; the above-mentioned transmission data is only visible to the jump server and the application server associated with this transfer process during the corresponding transfer process, after the transfer is completed, the transmission data is converted into subprogram data corresponding to the second virtual scene according to preset data rules.

Preferably, the above-mentioned transfer request is triggered by an interaction operation received by a preset control provided in the first virtual scene, wherein the preset control is associated with the second virtual scene.

Another embodiment of the invention discloses a data processing system that provides human-computer interaction application program based on virtual scenes, including:

a first application server that provides a first virtual scene;

a second application server that provides a second virtual scene;

a jump server connected to the above-mentioned first application server and the second application server respectively, and storing transfer control logic;

a long-term storage server connected to the first application server and the second application server respectively, and storing global data;

the first application server determines whether a transfer request for transferring at least one virtual character from a first virtual scene to a second virtual scene has been received;

when the first application server receives the transfer request, the jump server generates transmission data associated with the virtual character, and transferring the virtual character from the first virtual scene to the second virtual scene on the basis of the transmission data and global data associated with the virtual character.

Preferably, the application program includes at least one subprogram, the subprogram includes at least one virtual scene, and the above-mentioned first virtual scene and the above-mentioned second virtual scene belong to the same or different subprograms, each virtual scene is supported by an independent application server; The above-mentioned virtual character generates subprogram data when realizing human-computer interaction in the virtual scene, the subprogram data is stored in the application server, and is only visible to the application server associated with the subprogram data; the subprogram data is generated when the virtual character logs in or transfers into the application server, and is destroyed when the virtual character logs out or transfers out of the application server; the above-mentioned transmission data is generated by the above-mentioned jump server after extracting subprogram data required for transfer from the application server corresponding to a first virtual scene and processing it, to support the transfer of the virtual character from the first virtual scene to a second virtual scene; the transmission data is only visible to the jump server and the application server associated with this transfer process during the corresponding transfer process, after the transfer is completed, the transmission data is converted into subprogram data corresponding to the second virtual scene according to preset data; the above-mentioned global data is visible to all application servers and supports reading and writing.

The application program includes at least one subprogram, the subprogram includes at least one virtual scene, and the first virtual scene and the second virtual scene belong to the same or different subprograms, each virtual scene is supported by an independent application server;

further, the application program subprogram runs the human-computer interaction function carrying the virtual scene through logical groups, and each logical group is bound to a unique logical group serial number, one or more virtual characters in the same logical group realize human-computer interaction according to the functional logic of the subprogram; The data processing system of the application further includes:

a management server setting the number of logical groups according to the number of virtual characters required to be carried by each virtual scene;

a matching server connected to the management server and the above-mentioned jump server, matching logical groups for the virtual characters transferred to the second virtual scene according to matching rules.

Preferably, the data processing system of the application further includes a user device communicatively connected with the above-mentioned first application server, and the user interacts with at least one virtual character in the first virtual scene displayed by the user device; when the preset control in the first virtual scene displayed by the user device receives an interaction operation from the user, the transfer request is sent to the first server, wherein the preset control is associated with the second virtual scene.

This application also discloses a computer-readable storage medium with a computer program stored thereon, wherein when the computer program is executed by a processor, the steps of the above data processing method are implemented.

The application also discloses a computer program product, including a computer program that implements the steps of the above data processing method when executed by a processor.

Compared with the prior art, the embodiments of this invention have the following main differences and effects:

In the invention, by means matching the global data and the transmission data, the virtual character being transferred from the first virtual scene to the second virtual scene is supported, relevant data information when interacting in the first virtual scene is retained, and mutual data sharing is implemented. In the invention, by matching logical groups to virtual characters according to matching rules, the user is matched to a suitable user environment and the user experience is optimized. The invention also discloses a mechanism for saving, converting, and transmitting global data, subprogram data, and transmission data, and provides a flexible and efficient data management method for application programs oriented to virtual scene human-computer interaction applications. In the invention, the user only needs to trigger the preset control in the first virtual scene to realize the transfer process of the virtual character, and the data processing is completed in the background. The operation is simple for the user, and there is no need to exit the first virtual scene and return to the application program platform lobby, shortening the waiting time.

DETAILED DESCRIPTION

Figure 1:
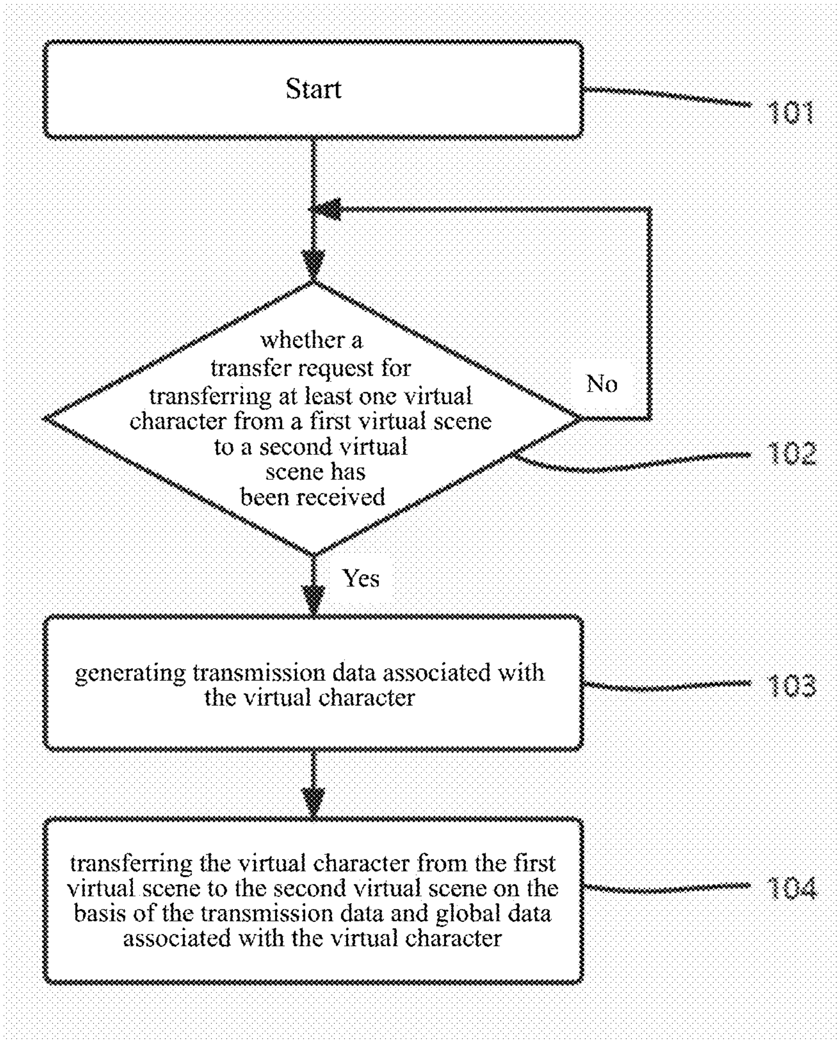
FIG. 1 shows a flow chart of a data processing method according to an embodiment of the application.

The present application is further described below with reference to specific embodiments and the drawings. It should be understood that the specific embodiments described herein are used merely to explain the present application, but are not intended to limit the present application. In addition, for ease of description, only some but not all structures or processes related to the present application are shown in the drawings. It should be noted that in this description, similar numerals and letters designate like items in the following drawings.

It should be understood that although the terms first, second, etc. may be used in the present disclosure to describe various features, these features should not be limited to these terms. These terms are used for distinction only and shall not be understood as an indication or implication of relative importance. For example, without departing from the scope of example embodiments, a first feature may be referred to as a second feature, and similarly a second feature may be referred to as a first feature.

In the description of the present application, it is also to be noted that, unless expressly stated and defined otherwise, the terms "arrangement", "connection", "link" are to be understood in a broad sense, for example, as a fixed connection, as a detachable connection, or as an integrated connection; may be a mechanical connection or an electrical connection; may be directly connected or indirectly connected by means of an intermediate medium, and may be internal communication of the two elements. The specific meaning of the above terms in this embodiment will be understood by one of ordinary skill in the art.

Illustrative embodiments of the present application include, but are not limited to a data processing method, a system, a medium, and a computer program product.

Various aspects of the illustrative embodiments are described by using terms commonly used by persons skilled in the art to convey the substance of their work to others skilled in the art. However, it is apparent to the persons skilled in the art that some alternative embodiments may be practiced by using some of the described features. For purposes of explanation, specific numbers and configurations are set forth in order to provide a more thorough understanding of the illustrative embodiments. However, it is apparent to the persons skilled in the art that alternative embodiments may be practiced without the specific details. In other instances, well-known features have been omitted or simplified herein in order to avoid obscuring the illustrative embodiments of the application.

In addition, various operations will be described as a plurality of operations separated from each other in a manner most conducive to understanding the illustrative embodiments; however, the order of description should not be construed as to imply that these operations are necessarily dependent on the order of description, many of which operations may be performed in parallel, concurrently, or simultaneously. In addition, the order of operations can also be rearranged. When the described operations are completed, the processing may be terminated, but may further have additional steps not included in the figures. The processing may be corresponding to a method, a function, a procedure, a subroutine, a subprogram, or the like.

References in the specification to "an embodiment", "embodiment", "illustrative embodiment" and the like indicate that the described embodiments may include specific features, structures or properties, but each embodiment may or may not necessarily include specific features, structures or properties. Moreover, these phrases do not necessarily refer to the same embodiment. Furthermore, when certain features are described with reference to specific embodiments, the knowledge of the persons skilled in the art can affect the combination of these features with other embodiments, whether or not those embodiments are explicitly described.

Unless the context otherwise requires, the terms "comprising," "having," and "including" are synonyms. The phrase "A and/or B" indicates "(A), (B) or (A and B)".

As used herein, the term "module" may refer to, be a part of, or include: a memory (shared, dedicated, or group), an application-specific integrated circuit (ASIC), an electronic circuit, and/or a processor (shared, dedicated, or a group) that can execute one or more software or firmware programs, a combinatorial logic circuit, and/or another proper component that provides the function.

In the drawings, some structural or methodological features may be shown in a particular arrangement and/or order. However, it should be understood that no such specific arrangement and/or ordering is required. Rather, in some embodiments, features may be described in a different manner and/or order than shown in the illustrative figures. In addition, the inclusion of structural or methodological features in a particular figure does not imply that all embodiments need to include such features, and in some embodiments, these features may not be included or may be combined with other features.

To make the objectives, technical solutions, and advantages of the present application clearer, the following further describes the embodiments of the present application in detail with reference to the accompanying drawings.

Figure 2:
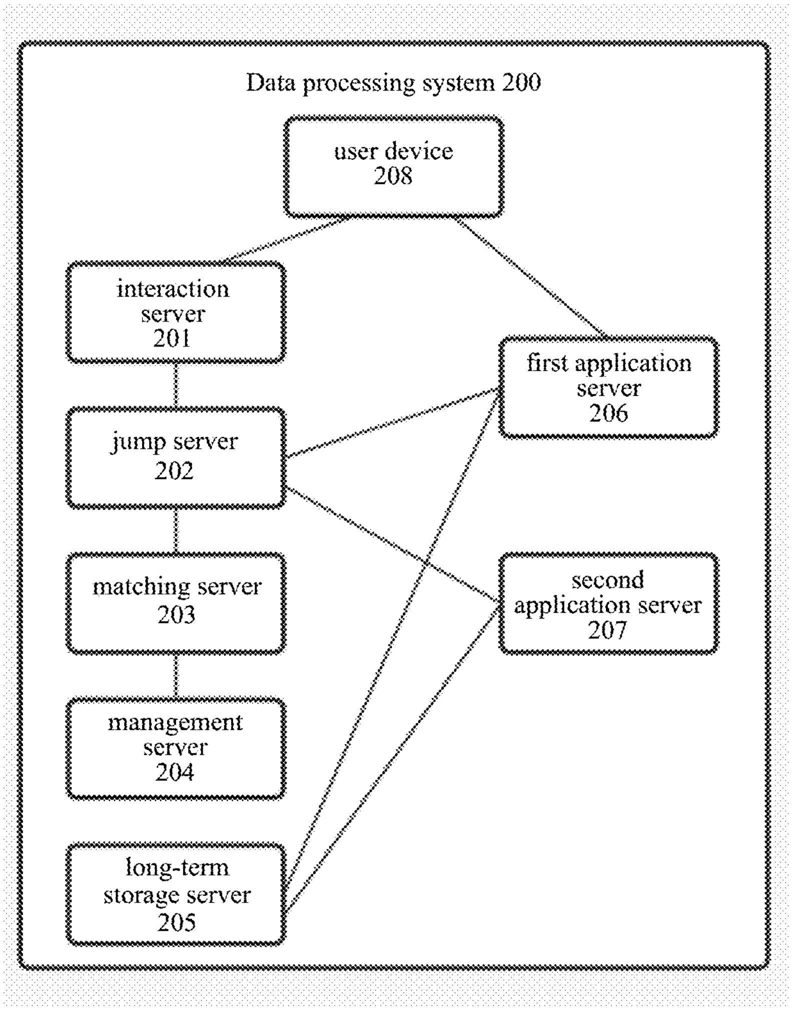
FIG. 2 shows a block diagram of a data processing system according to an embodiment of the application.

FIG. 2 shows a block diagram of a data processing system 200 according to an embodiment of the application. The data processing system 200 includes a user device 208, a first application server 206, and a second application server 207. The user device 208 can be a desktop user device or a mobile user device. The desktop user device can be, but is not limited to, a personal computer, an industrial computer, etc., The mobile user device can be, but is not limited to, various laptops, smartphones, tablets, portable wearable devices, etc. The user device 208 is installed with application software that can access remote services, such as a browser or client application program. The application program involved in the embodiment of this application may be a client application program (i.e. APP), or it may be a light client service program such as a web page or an applet.

The first application server 206 and the second application server 207 may be background servers corresponding to the applications installed on the user device 208. For example, they may be independent physical servers or a server cluster or distributed system composed of multiple servers. They may also be cloud servers that provide cloud services, cloud database, cloud computing, cloud functions, cloud storage, network services, cloud communications, middleware services, domain name services, security services, CDN, and basic cloud computing services such as big data and artificial intelligence platforms, but are not limited to this.

The user device 208 and the first application server 206 are connected through a network. The network includes one or more and may include various connection types, such as wired, wireless communication links, cloud or optical fiber cables, etc. Specific examples of the network described above may include the Internet provided by the communications provider of the user device 208.

Figure 3:
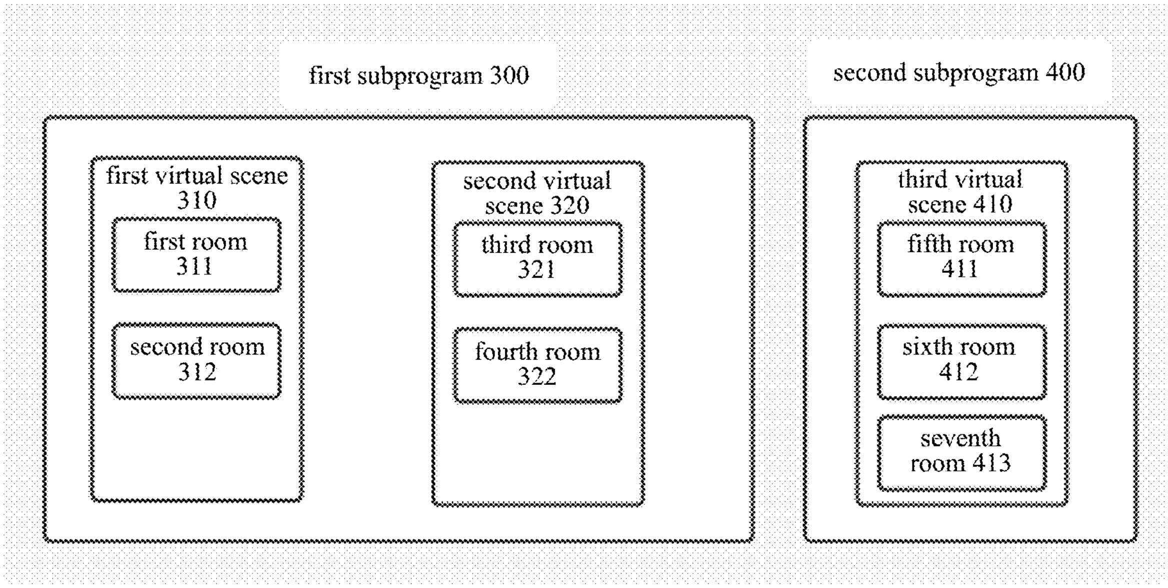
FIG. 3 shows a schematic diagram of a subprogram according to an embodiment of the application.

Specifically, the application program in this embodiment is a comprehensive application platform that integrates game entertainment, social and leisure functions. The comprehensive application platform provides users with subprograms independently developed by different developers based on the editing tools provided by the platform service provider of the comprehensive application platform. Each subprogram can be considered an independent game. During the development of subprograms, developers must comply with the interfaces and data structures defined by the comprehensive application platform. At the same time, developers have a high degree of flexibility to formulate the game rules and gameplay of each subprogram, as well as the interaction mechanism when interacting with other subprograms. Each subprogram contains one or more virtual scenes. Each virtual scene can provide specific human-computer interaction functions for users to implement different game rules and gameplay. Therefore, each virtual scene is supported and run by a functionally independent application server, supporting users to implement human-computer interaction on the user device 208, such as viewing the content of the virtual scene and controlling the virtual character in the virtual scene to perform interactive activities. The virtual character can be a human-like 2D or 3D model, or It is an animal model, or an operable virtual device such as a car, a tank, or an airplane. As shown in FIG. 3, the first subprogram 300 includes two virtual scenes, namely the first virtual scene 310 and the second virtual scene 320, while the second subprogram 400 only includes the third virtual scene 410. The number of virtual scenes in each subprogram depends on the functional design of the subprogram, which can be one or multiple. For multiple virtual scenes in the same subprogram, a main virtual scene and ancillary virtual scenes can also be defined. For example, the second subprogram 400 whose interactive function is fishing may only include a third virtual scene 410 for fishing, and the third virtual scene 410 includes waters, land, vegetation, etc.; users can control virtual characters to walk, run, jump, and pass through various obstacles such as vegetation on land, as well as collect fishing tools such as fishing gear and bait; when approaching the water, they can enter the fishing gameplay mode. For another example, for the social leisure first subprogram 300 with an economic system, the first virtual scene 310 may be a mine, which is provided and supported by the first application server 206; virtual characters can mine in the mine and obtain various mineral resources; the second virtual scene 320 may be a resource trading market, provided and supported by the second application server 207; virtual characters can list various mineral resources they have mined in the resource trading market, exchange for other resources they need, or exchange for virtual currency defined by the first subprogram. If based on the existing technical solution, since each virtual scene is supported and run by a functionally independent application server, only virtual characters and props in the same virtual scene can interact directly, and different virtual scenes cannot interact directly. This causes problems as described in the Background. After the user-controlled virtual character completes mining and obtains mineral resources in the first virtual scene 310, if the user wants it to enter the second virtual scene 320 for transactions, the user must log out first according to existing technical means. That is, exit from the first virtual scene 310. That is, the data related to the virtual character is unloaded from the first application server 206. Then the interactive interface returning to the first subprogram 300 is displayed on the user device 208. The user performs a login operation after finding the entrance to the second virtual scene 320. Then, the virtual character related data is loaded in the second application server 207. The above-mentioned overall process operation is relatively cumbersome, and according to existing technical means, bringing the mineral resource data obtained in the first virtual scene 310 into the second virtual scene 320 and using it requires multiple data accesses, which places a heavy performance burden on the server.

This embodiment proposes a solution to the above problem. The data processing system 200 shown in FIG. 2 also includes a jump server 202 and a long-term storage server 205, which can be independent physical servers or can be a specific server unit divided according to function in a central processing server, or a server cluster or distributed system composed of multiple servers. They may also be cloud servers that provide cloud services, cloud database, cloud computing, cloud functions, cloud storage, network services, cloud communications, middleware services, domain name services, security services, CDN, and basic cloud computing services such as big data and artificial intelligence platforms, but are not limited to this. The jump server 202 is connected to the first application server 206 and the second application server 207 respectively, and stores transfer control logic. The transfer control logic is used to process virtual scene transfer requests for virtual characters. The long-term storage server 205 is connected to the first application server 206 and the second application server 207 respectively, and stores global data. The global data is visible to all subprograms (ie, the first subprogram 300 and the second subprogram 400 in this embodiment) and supports reading and writing, including the virtual character's model information, level information, equipment information, etc. The virtual scenes in each subprogram are supported by each application server, so each application server (ie, the first application server 206 and the second application server 207 in this embodiment) also has permission to read and write global data.

In this embodiment, when the user controls the virtual character to interact in the first virtual scene, the first application server 206 will determine whether a transfer request for transferring the virtual character from the first virtual scene 310 to the second virtual scene 320 is received. Specifically, when the user device 208 displays the first virtual scene 310, a preset control will be displayed at a preset location, for example, a transfer button (ie, a preset control) is set up at the entrance of the mine, and the transfer button may be marked with "Transfer to Resource Trading Market", that is, the transfer button may prompt the user to transfer the virtual character to the second virtual scene 320 by touching this button. The preset control can be in any form that is easy for users to discover and use, such as a door, or a teleportation port shaped like a black hole, etc. The preset control is associated with the second virtual scene 320 and can be bound to a transfer request instruction directed to the second virtual scene 320. When the user performs an interaction operation to trigger the preset control, the user device 208 sends the transfer request instruction to the first application server 206. Then the first application server 206 will receive the transfer request instruction and learn that the virtual character needs to be transferred from the first virtual scene 310 to the second virtual scene 320. Since each virtual scene is supported and run by a one-to-one corresponding application server, the IP address or server code of the application server can be recorded on the transfer request instruction, thereby realizing the confirmation of the transfer target virtual scene. Similarly, multiple preset controls associated with different virtual scenes can also be set in the first virtual scene 310, and the user can choose to transfer to different virtual scenes, such as the third virtual scene 410, to realize virtual scene transfer across subprograms. In other embodiments of the invention, server background operations can also be used, wherein the administrator directly sends batch transfer instructions for multiple virtual characters to relevant application servers to realize batch transfer of virtual characters. In another embodiment of the invention, when the user controls the virtual character to interact in the first virtual scene, the user's friends in application program can send a transfer invitation from another virtual scene and send it to the user through an application program message. Then, implement the transfer of the virtual character after the user chooses to accept the invitation.

After receiving the transfer request, the first application server 206 will synchronize the transfer request to the jump server 202. The jump server 202 runs its internally stored transfer control logic to process the virtual scene transfer request for the virtual character. The transfer control logic first confirms the transferred virtual character information, and obtains the information of the original application server (the first application server 206 in this embodiment) and the target application server (the second application server 207 in this embodiment); then the jump server 202 obtains the subprogram data related to the virtual character from the first application server 206 to generate transmission data. The relevant content of the subprogram data will be explained below. The transmission data includes the position parameters, movement posture parameters of the virtual character, etc., ensuring that the virtual character can still maintain the previous movement posture after being transferred to the second virtual scene 320, and provide the user with coherent operating experience. In this embodiment, the transmission data also includes mineral resource information, so that users can conveniently use or trade various mineral resources in other virtual scenes. Finally, the jump server 202 transfers the virtual character from the first virtual scene 310 to the second virtual scene 320 based on the global data and transmission data associated with the virtual character. Specifically, the jump server 202 sends the transmission data to the second application server 207, and synchronizes the global data information associated with the virtual character to the second application server 207 (such as synchronizing the ID of the virtual character to the second application server 207). The second application server 207 reads the global data associated with the virtual character from the long-term storage server 205, such as model information, level information, and equipment information, and loads the transmission data and the global data associated with the virtual character together in the second virtual scene 320. So far, the virtual character appears in the second virtual scene 320, and the transfer operation is completed. Correspondingly, the user device 208 establishes a communication connection with the second application server 207 (not shown in FIG. 2), and the user can interact with the virtual character in the second virtual scene 320 through the user device 208. For the user, after triggering the preset control, the virtual character can be seen in the second virtual scene 320 after a short transition interface. There is no need to log out or log in, and it is simple and fast, and it also retains the movement posture during interaction in the first virtual scene 310 and the mineral resources generated by mining. After the transfer is completed, the first application server 206 deletes the subprogram data associated with the virtual character, and the jump server 202 no longer stores the transmission data associated with the virtual character. In this embodiment, whether it is the transfer of virtual characters between different virtual scenes under the same subprogram, or the transfer of virtual characters between virtual scenes under different subprograms, it can be realized based on the above technical solution, because virtual scenes under different subprograms are also supported by each application server. They are all connected to the jump server 202 and the long-term storage server 205. After receiving the transfer application, they directly complete the generation, sending and loading of the transmission data according to the above scheme, as well as the reading and loading of global data associated with the virtual character.

In another embodiment of the invention, the case where a virtual character transfers between virtual scenes under different subprograms is specifically described. As explained above, subprograms can be independently developed by different developers based on the editing tools provided by the platform service provider of the application program involved in the invention. Different developers can develop different game rules and gameplay for their own subprograms, as well as interaction mechanisms when interacting with other subprograms. For example, the second subprogram 400 in FIG. 3 is a fishing game and may only include a third virtual scene 410 for fishing, and the third virtual scene 410 includes waters, land, vegetation, etc.; users can control virtual characters to walk, run, jump, and pass through various obstacles such as vegetation on land, as well as build or collect fishing tools such as fishing gear and bait; when approaching the water, they can enter the fishing gameplay mode to catch various fish. From the above description, it can be easily known that the gameplay of the second subprogram 400 and the various resources required during the game are very different from the first subprogram 300. The resources described here can be understood as a form of equipment for virtual characters in the application. The equipment information will be explained in detail below. However, the developer of the second subprogram 400 can use the editing tool provided by the platform service provider of the application program to define whether to activate the resource sharing function with the first subprogram 300 according to his own preferences, that is, the virtual character is allowed to apply various resources collected during the game process of the first subprogram 300 to the game process of the second subprogram 400, and it is possible to further define how to utilize various resources originating from the first subprogram 300, that is, to formulate an interaction mechanism with the first subprogram. In the same way, the developer of the first subprogram 300 can also formulate a corresponding interaction mechanism with the second subprogram 400 to achieve interoperability between the two subprograms, and presets of the other subprogram are set in each subprogram. The preset controls of the other subprogram are set in each subprogram, which facilitates the user to control the virtual character to transfer between the two subprograms, provides users with more interactive choices, and improves the fun of the application program. For example, the user can control the virtual character to fish in the third virtual scene 410 of the second subprogram 400, and then transfer to the second virtual scene 320 of the first subprogram 300 through the preset controls set in the third virtual scene 410. And trade fish in the resource trading market and exchange for iron ore resources. And then transfer back to the third virtual scene 410 of the second subprogram 400 through the preset control set in the second virtual scene 320, and use the iron ore resources obtained from trade to build higher-level fishing gear to catch higher-level fish. Other virtual characters can obtain fish by trading in the resource trading market, and then transfer to the virtual scene of another subprogram, such as a casual dating game with a BBQ (BBQ activity) function, where the fish can be grilled and provided to friends to eat, thereby improving the friend's favorability and improving the level of the virtual character.

The above-mentioned interaction mechanism between subprograms can be negotiated and formulated collaboratively by different developers using the developer-oriented communication service function provided by the application; or it can also be that the developer unilaterally provides an interaction mechanism offer to other developers in the subprograms developed by himself; when other developers accept the offer, it is deemed that both parties have determined the interaction mechanism, so that preset controls associated with the other party's subprogram can be preset in the virtual scene of their respective subprograms.

Based on the above embodiments and FIG. 3, a specific transfer method will be described by taking the virtual character transferring from the third virtual scene 410 of the second subprogram 400 to the second virtual scene 320 of the first subprogram 300 as an example. When the virtual character triggers the preset control that can be transferred to the second virtual scene 320 of the first subprogram 300 in the third virtual scene 410 of the second subprogram 400, the application server corresponding to the third virtual scene 410 will receive the transfer request, and it will synchronize the transfer request to the jump server 202. The jump server 202 runs its internally stored transfer control logic to process the virtual scene transfer request for the virtual character. The transfer control logic stores the interaction mechanism between the second subprogram 400 and the first subprogram 300, for example, what kind of resources can be transferred, etc. The transfer control logic will confirm the transferred virtual character information, and obtain the information of the original application server (not shown) and the target application server (the second application server 207 in this embodiment); then the jump server 202 obtains the subprogram data related to the virtual character from the original application server corresponding to the third virtual scene 410 to generate transmission data. The relevant content of the subprogram data will be explained below. The transmission data includes the position parameters, movement posture parameters of the virtual character, etc., ensuring that the virtual character can still maintain the previous movement posture after being transferred to the second virtual scene 320, and provide the user with coherent operating experience. In this embodiment, according to the above-mentioned interaction mechanism between the second subprogram 400 and the first subprogram 300, the transmission data also includes fish information, for example, the type, size and quantity of fish caught by the virtual character in the third virtual scene 410 of the second subprogram 400, etc, so that the user can trade the fish in the second virtual scene 320, but the resource information in the third virtual scene 410 of other second subprograms 400 has nothing to do with the interaction mechanism, such as fishing gear information, may not be included in the transmission data. Finally, the jump server 202 transfers the virtual character from the third virtual scene 410 to the second virtual scene 320 based on the global data and transmission data associated with the virtual character. Specifically, the jump server 202 sends the transmission data to the second application server 207, and synchronizes the global data information associated with the virtual character to the second application server 207 (such as synchronizing the ID of the virtual character to the second application server 207). The second application server 207 reads the global data associated with the virtual character from the long-term storage server 205, such as model information, level information, and equipment information, and loads the transmission data and the global data associated with the virtual character together in the second virtual scene 320. So far, the virtual character appears in the second virtual scene 320, and the transfer operation is completed. Correspondingly, the user device 208 establishes a communication connection with the second application server 207 (not shown in FIG. 2), and the user can interact with the virtual character in the second virtual scene 320 through the user device 208. For the user, after triggering the preset control, the virtual character can be seen in the second virtual scene 320 after a short transition interface. There is no need to log out or log in, and it is simple and fast, and it also retains the movement posture during interaction in the third virtual scene 410 and the fish obtained by fishing.

In other embodiments of the invention, a flexible transfer function can also be designed, such as supporting the random transfer of virtual characters to other virtual scenes. That is the preset random algorithms in the transfer request instruction can point to any one of all known virtual scenes.

Furthermore, when the virtual character implements human-computer interaction in the virtual scene, subprogram data is generated. The subprogram data is stored in the application server and is only visible to the associated application server, and is generated starting from the time when the virtual character logs in or transfers to the application server, destroyed when the virtual character logs out or transfers out of the application server. Specific to this embodiment, combined with the examples of FIG. 2, FIG. 3, and FIG. 4, the user controls the virtual character to interact in the first virtual scene 310. For example, controlling the movement of the virtual character will generate position information, and controlling the virtual character to perform actions will generate movement posture information, controlling virtual character mining will generate mineral resource quantity information. The above information data are all first subprogram data and are stored in the first application server 206 corresponding to the first virtual scene 310. The first subprogram data starts to be generated when the user starts to log in to the first application server 206. Only the first application server 206 can access and read and write the first subprogram data. When the user logs out of the first application server 206 or transfers the virtual character to the second virtual scene 320, the first application server 206 no longer saves the first subprogram data. Optionally, the various resources, such as minerals, fish, etc., obtained by the virtual character during the subprogram game process, and their corresponding resource information can be long-term stored in the application server corresponding to the subprogram as part of the subprogram data, and corresponds to the ID of the virtual character, so that the virtual character can still obtain the previous resources when logging in again or transferring to the subprogram. When the virtual character is transferred to the second virtual scene 320, the second application server 207 corresponding to the second virtual scene 320 supports the operation, generates and stores the second subprogram data. At the initial moment when the second subprogram data is generated, the second subprogram data comes from the transmission data and the global data associated with the virtual character, and then is continuously modified and changed as the user controls the interaction process of the virtual character in the second virtual scene 320. It should be noted that with the interaction process of the virtual character, the first subprogram data or the second subprogram data can be converted into the global data. For example, if the user improves the level of the virtual character through an interaction process in the first virtual scene 310, the updated level information will also be synchronized to the long-term storage server 205 for storage as global data. For another example, if the user purchases a costume in the second virtual scene 320 and wears it on the virtual character, the costume information will also be synchronized to the long-term storage server 205 as global data. When the user controls the virtual character to enter a virtual scene, global data will be read and the latest fashions will be displayed on the virtual character. Optionally, the resource information as part of the subprogram data can also be converted into global data, and the equipment information in the global data can be periodic synchronized to the long-term storage server 205. The so-called periodic synchronization here may be information synchronization at fixed time intervals, or in order to reduce the pressure on the long-term storage server 205, information synchronization may be performed only when the virtual character logs out or transfers out of the subprogram. Here, although the equipment information is part of the global data, not all equipment information can be applied globally in the application. The clothing and equipment of the virtual character can be used globally, but the resources obtained from each subprogram need to be determine whether they can be called in a certain subprogram through the game rules, gameplay and interaction mechanisms of each subprogram.

For the transmission data, in the embodiment, it is used to support the transfer of the virtual character from the first virtual scene 310 to the second virtual scene 320, and is only visible to the jump server and the application server associated with this transfer process during the corresponding transfer process. That is, it is only visible to the jump server 202, the first application server 206, and the second application server 207. After the virtual character transfer is completed, the transmission data is converted into the second subprogram data corresponding to the second virtual scene 320 according to the preset data rules (such as the movement posture of the virtual character, the number of mineral resources), and the jump server 202 no longer saves the transmission data.

Furthermore, in this embodiment, the data processing system 200 also includes a management server 204 and a matching server 203. The matching server 203 is connected to the management server 204 and the jump server 202. The management server 204 sets the number of logical groups according to the number of virtual characters that each virtual scene needs to carry. The logical groups can be understood as rooms in the game application, and the subprograms run human-computer interaction functions that carry virtual scenes through logical groups. Each logical group is bound to a unique logical group serial number. As shown in FIG. 3, the first virtual scene 310 corresponds to two logical groups, namely the first room 311 and the second room 312. The first virtual scene 310 supported by the two rooms is the same, but the data is isolated from each other, that is, the virtual character in the first room 311 cannot directly interact with the virtual character in the second room 312, and the subprogram data generated by the virtual character interaction in the first room 311 is also invisible to the second room 312. The reason for using logical groups is that there is an upper limit on the number of virtual characters that each virtual scene can carry. In order to ensure that each user can get a good experience, multiple logical groups need to be used to share the number of virtual characters to ensure that the number of virtual characters in each logical group is within the appropriate range. In addition, some subprograms provide group confrontation game functions, and there are regulations on the number of virtual characters participating in a single game. For example, in a five-on-five battle game, there are a maximum of 10 virtual characters in a room. On this basis, each logical group is supported by independent application server resources, that is, the application server resources enjoyed by different logical groups are mutually exclusive. Furthermore, the transfer of virtual characters between different virtual scenes can be understood as transfer between logical groups. In this embodiment, when the virtual character in the first room 311 of the first virtual scene 310 is transferred to the second scene 320 according to the foregoing description, the virtual character is transferred from the first room 311 to the third room 321 or the fourth room 322. During this process, the matching server 203 matches logical groups for the virtual characters transferred to the second virtual scene according to the matching rules, that is, selects to assign the virtual characters to the third room 321 or the fourth room 322 according to the matching rules. The matching rules are defined by the developer of the first subprogram 300, for example, matching according to the level of the virtual characters, assigning virtual characters with the same or close levels in the same room, another example is matching based on friend relationships, and assigning virtual characters to rooms with virtual characters that already have a friend relationship with the user. FIG. 3 also shows that the third virtual scene 410 corresponds to three logical groups, namely the fifth room 411, the sixth room 412, and the seventh room 413. If the virtual character is transferred from the first virtual scene 310 to the third virtual scene 410, the corresponding logical group matching method is as described above and will not be described again.

In other embodiments of the invention, in order to provide users with better online social interaction functions, the data processing system 200 also includes an interactive server 201 connected to the user device 208 and the jump server 202. The interactive server 201 is responsible for social and activity push service functions, and the unified interface defined by the data processing system 200 pushes the data of the above service functions to the user device 208. When the transfer control process occurs, the jump server 202 sends synchronization information to the interaction server 201, including virtual scene change information, logical group change information, etc. corresponding to the transferred virtual character.

As shown in FIG. 1, the present invention also provides an embodiment of a data processing method applied to a application program that provide human-computer interaction based on virtual scenes. The application is a comprehensive application platform that integrates game entertainment, social and leisure functions. The comprehensive application platform provides users with subprograms from different developers. During the development of subprograms, developers must comply with the interfaces and data structures defined by the comprehensive application platform. This data processing method realizes the transfer of virtual characters between different virtual scenes through the following steps:

- step 102 is a determination step: determining whether a transfer request for transferring at least one virtual character from a first virtual scene to a second virtual scene has been received;
- step 103 is a generation step: when the transfer request is received, generating transmission data associated with the virtual character;
- step 104 is a transfer step: transferring the virtual character from the first virtual scene to the second virtual scene on the basis of the transmission data and global data associated with the virtual character.

Figure 4:
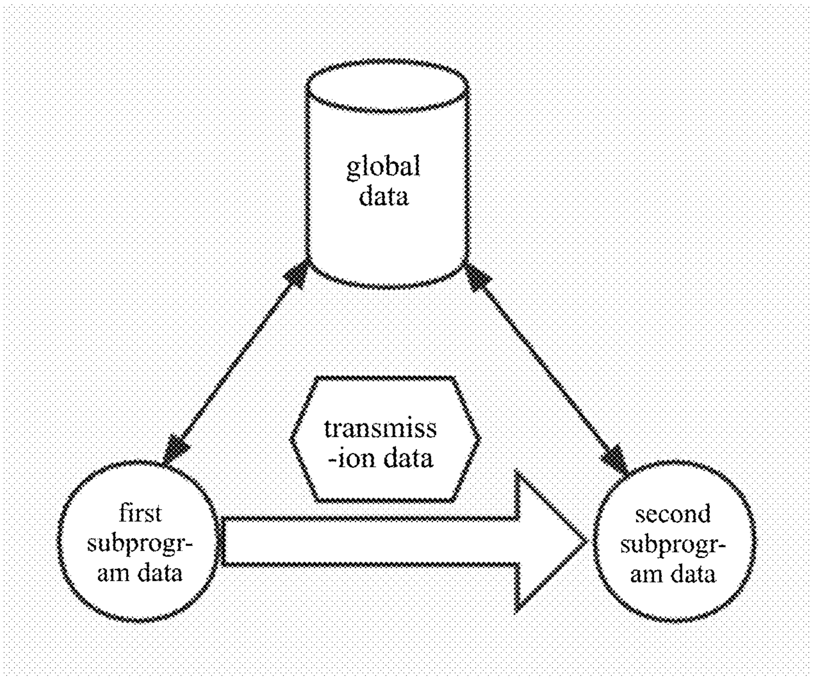
FIG. 4 shows a schematic diagram of a data management mechanism according to an embodiment of the application.

A detailed description will be given below with reference to FIGS. 2, 3, and 4. In the determination step, the first application server 206 determines whether a transfer request for transferring the virtual character from the first virtual scene 310 to the second virtual scene 320 is received. Specifically, when the user device 208 displays the first virtual scene 310, a preset control will be displayed at a preset location, for example, a transfer button (ie, a preset control) is set up at the entrance of the mine, and the transfer button may be marked with "Transfer to Store", that is, the transfer button may prompt the user to transfer the virtual character to the second virtual scene 320 by touching this button. The preset control is associated with the second virtual scene 320 and can be bound to a transfer request instruction directed to the second virtual scene 320. When the user performs an interaction operation to trigger the preset control, the user device 208 sends the transfer request instruction to the first application server 206. Then the first application server 206 will receive the transfer request instruction and learn that the virtual character needs to be transferred from the first virtual scene 310 to the second virtual scene 320. Since each virtual scene is supported and run by a one-to-one corresponding application server, the IP address or server code of the application server can be recorded on the transfer request instruction, thereby realizing the target-directed transfer. Similarly, multiple preset controls associated with different virtual scenes can also be set in the first virtual scene 310, and the user can choose to transfer to different virtual scenes, such as the third virtual scene 410, to realize virtual scene transfer across subprograms. In other embodiments of the invention, server background operations can also be used, wherein the administrator directly sends batch transfer instructions for multiple virtual characters to relevant application servers to realize batch transfer of virtual characters.

In the generation step, after receiving the transfer request, the first application server 206 will synchronize the transfer request to the jump server 202. The jump server 202 runs its internally stored transfer control logic to process the virtual scene transfer request for the virtual character. The transfer control logic first confirms the transferred virtual character information, and obtains the information of the original application server (the first application server 206 in this embodiment) and the target application server (the second application server 207 in this embodiment); then the jump server 202 obtains the subprogram data related to the virtual character from the first application server 206 to generate transmission data. The relevant content of the subprogram data is recorded in the relevant embodiments of the data processing system 200 mentioned above. The transmission data includes the position parameters, movement posture parameters of the virtual character, etc., ensuring that the virtual character can still maintain the previous movement posture after being transferred to the second virtual scene 320, and provide the user with coherent operating experience. In this embodiment, the transmission data also includes gold coin quantity information, so that users can conveniently use gold coins other virtual scenes.

In the transfer step, the jump server 202 transfers the virtual character from the first virtual scene 310 to the second virtual scene 320 based on the global data and transmission data associated with the virtual character. Specifically, the jump server 202 sends the transmission data to the second application server 207, and synchronizes the global data information (such as the ID of the virtual character) associated with the virtual character to the second application server 207. The second application server 207 reads the global data associated with the virtual character from the long-term storage server 205, such as model information, level information, and equipment information, and loads the transmission data and the global data associated with the virtual character together in the second virtual scene 320. So far, the virtual character appears in the second virtual scene 320, and the transfer operation is completed. Correspondingly, the user device 208 establishes a communication connection with the second application server 207 (not shown in FIG. 2), and the user can interact with the virtual character in the second virtual scene 320 through the user device 208. For the user, after triggering the preset control, the virtual character can be seen in the second virtual scene 320 after a short transition interface. There is no need to log out or log in, and it is simple and fast, and it also retains the movement posture during interaction in the first virtual scene 310 and the gold coins generated by mining. After the transfer is completed, the first application server 206 deletes the subprogram data associated with the virtual character, and the jump server 202 no longer stores the transmission data associated with the virtual character. In this embodiment, whether it is the transfer of virtual characters between different virtual scenes under the same subprogram, or the transfer of virtual characters between virtual scenes under different subprograms, it can be realized based on the above technical solution, because virtual scenes under different subprograms are also supported by each application server. They are all connected to the jump server 202 and the long-term storage server 205. After receiving the transfer application, they directly complete the generation, sending and loading of the transmission data according to the above scheme, as well as the reading and loading of global data associated with the virtual character.

In this embodiment, each subprogram includes one or more virtual scenes, and each virtual scene is supported and run by an independent application server. The virtual scenes provide user-oriented human-computer interaction functions and support users to implement human-computer interaction on the user device 208, such as viewing the content of the virtual scene and controlling the virtual character in the virtual scene to perform interactive activities. The virtual character can be a human-like 3D model, or It is an animal model, or an operable virtual device such as a car, a tank, or an airplane. As shown in FIG. 3, the first subprogram 300 includes two virtual scenes, namely the first virtual scene 310 and the second virtual scene 320, while the second subprogram 400 includes the third virtual scene 410. The number of virtual scenes in each subprogram depends on the functional design of the subprogram, and may be one or multiple. For example, the second subprogram 400 whose interactive function is fishing may only include a third virtual scene 410 for fishing, and the third virtual scene 410 includes waters, land, vegetation, etc.; For another example, for the social leisure first subprogram 300 with an economic system, the first virtual scene 310 may be a mine, which is provided and supported by the first application server 206; virtual characters can mine in the mine and obtain gold coins. The second virtual scene 320 can be a store, which is provided and supports the operation by the second application server 207. The virtual characters can spend gold coins in the store to purchase goods.

There is an upper limit on the number of virtual characters that each virtual scene can carry. In order to ensure that each user can get a good experience, the transfer step further include:

matching logical groups for the virtual characters transferred to the second virtual scene according to matching rules.

Wherein the logical groups can be understood as rooms in the game application, and the subprograms run human-computer interaction functions that carry virtual scenes through logical groups. Each logical group is bound to a unique logical group serial number. Using multiple logical groups to share the number of virtual characters to ensure that the number of virtual characters in each logical group is within the appropriate range. On this basis, each logical group is supported by independent application server resources, that is, the application server resources enjoyed by different logical groups are mutually exclusive. As shown in FIG. 3, the first virtual scene 310 corresponds to two logical groups, namely the first room 311 and the second room 312. The first virtual scene 310 supported by the two rooms is the same, but the data is mutually exclusive. Isolation means that the virtual character in the first room 311 cannot directly interact with the virtual character in the second room 312, and the subprogram data caused by the virtual character interaction in the first room 311 is also invisible to the second room 312. In this embodiment, when the virtual character in the first room 311 of the first virtual scene 310 is transferred to the second scene 320 according to the foregoing description, the virtual character is transferred from the first room 311 to the third room 321 or the fourth room 322. During this process, the matching server 203 matches logical groups for the virtual characters transferred to the second virtual scene according to the matching rules, that is, selects to assign the virtual characters to the third room 321 or the fourth room 322 according to the matching rules. The matching rules are defined by the developer of the first subprogram 300, for example, matching according to the level of the virtual characters, assigning virtual characters with the same or close levels in the same room, another example is matching based on friend relationships, and assigning virtual characters to rooms with virtual characters that already have a friend relationship with the user.

Furthermore, the reason why this embodiment can realize the seamless transfer of virtual characters in different virtual scenes is because the data is divided into three types: global data, subprogram data, and transmission data. The organic combination of the three types supports the transfer process of virtual characters. The long-term storage server 205 stores global data. The global data is visible to all subprograms (ie, the first subprogram 300 and the second subprogram 400 in this embodiment) and supports reading and writing, including the virtual character's model information, level information, equipment information, etc. The virtual scenes in each subprogram are supported by each application server, so each application server (ie, the first application server 206 and the second application server 207 in this embodiment) also has permission to read and write global data.

When the virtual character implements human-computer interaction in the virtual scene, subprogram data is generated. The subprogram data is stored in the application server and is only visible to the associated application server, and is generated starting from the time when the virtual character logs in or transfers to the application server, destroyed when the virtual character logs out or transfers out of the application server. Specific to this embodiment, combined with the examples of FIG. 2, FIG. 3, and FIG. 4, the user controls the virtual character to interact in the first virtual scene 310. For example, controlling the movement of the virtual character will generate position information, and controlling the virtual character to perform actions will generate movement posture information, controlling virtual character mining will generate gold coin quantity information. The above information data are all first subprogram data and are stored in the first application server 206 corresponding to the first virtual scene 310. The first subprogram data starts to be generated when the user starts to log in to the first application server 206. Only the first application server 206 can access and read and write the first subprogram data. When the user logs out of the first application server 206 or transfers the virtual character to the second virtual scene 320, the first application server 206 no longer saves the first subprogram data. When the virtual character is transferred to the second virtual scene 320, the second application server 207 corresponding to the second virtual scene 320 supports the operation, generates and stores the second subprogram data. At the initial moment when the second subprogram data is generated, the second subprogram data comes from the transmission data and the global data associated with the virtual character, and then is continuously modified and changed as the user controls the interaction process of the virtual character in the second virtual scene 320. It should be noted that with the interaction process of the virtual character, the first subprogram data or the second subprogram data can be converted into the global data. For example, if the user upgrades the virtual character level through the interaction process in the first virtual scene 310, then The updated level information will also be synchronized to the long-term storage server 205 for storage as global data. For another example, if the user purchases a costume in the second virtual scene 320 and wears it on the virtual character, the costume information will also be synchronized to the long-term storage server 205 as global data. When the user controls the virtual character to enter another virtual scene, global data will be read and the latest fashions will be displayed on the virtual character.

For the transmission data, in the embodiment, it is used to support the transfer of the virtual character from the first virtual scene 310 to the second virtual scene 320, and is only visible to the jump server and the application server associated with this transfer process during the corresponding transfer process. That is, it is only visible to the jump server 202, the first application server 206, and the second application server 207. After the virtual character transfer is completed, the transmission data is converted into the second subprogram data corresponding to the second virtual scene 320 according to the preset data rules (such as the movement posture of the virtual character, the number of gold coins), and the jump server 202 no longer saves the transmission data.

According to some embodiments of the application, a computer storage medium is disclosed. Instructions are stored on the computer storage medium. When the instruction is executed on the computer, the computer is caused to execute any possible data processing method of the above-mentioned second embodiment.

The second embodiment is a method embodiment corresponding to the present embodiment, which can be implemented in cooperation with the second embodiment. The relevant technical details mentioned in the second embodiment are still valid in the present embodiment, and in order to reduce repetition, details are not described herein. Accordingly, the relevant technical details mentioned in the present embodiment may also be applied to the second embodiment.

According to some embodiments of the application, a computer program product is disclosed, including computer-executable instructions executed by a processor to implement a data processing method according to an embodiment of the invention.

The second embodiment is a method embodiment corresponding to the present embodiment, which can be implemented in cooperation with the second embodiment. The relevant technical details mentioned in the second embodiment are still valid in the present embodiment, and in order to reduce repetition, details are not described herein. Accordingly, the relevant technical details mentioned in the present embodiment may also be applied to the second embodiment.

In some cases, the disclosed embodiments may be implemented in hardware, firmware, software, or any combination thereof. The disclosed embodiments may also be implemented in the form of instructions or programs carried or stored on one or more transient or non-transient machine-readable (e.g., computer-readable) storage media, which may be read and executed by one or more processors or the like. When instructions or programs are run by a machine, the machine may perform the various methods described above. For example, the instructions may be distributed over a network or other computer-readable medium. Thus, a machine-readable medium may include, but is not limited to, any mechanism for storing or transmitting information in a form readable by a machine (e.g., a computer), such as a floppy disk, an optical disk, an optical disk read-only memory (CD-ROMs), a magneto-optical disk, a read-only memory (ROM), a random access memory (RAM), an erasable programmable read-only memory (EPROM), an electronically erasable programmable read-only memory (EEPROM), a magnetic or optical card, or a flash or tangible machine-readable memory for transmitting network information through electrical, optical, acoustic, or other forms of signals (e.g., a carrier wave, an infrared signal, a digital signal, etc.). Thus, a machine-readable medium includes any form of machine-readable medium suitable for storing or transmitting electronic instructions or machine (e.g., computer) readable information.

The embodiments of the present application have been described in detail above in connection with the drawings, but the use of the technical solutions of the present application is not limited to the various applications mentioned in the examples of the present patent, and various structures and variations can be readily implemented with reference to the technical solutions of the present application to achieve the various advantages mentioned herein. Various changes made without departing from the purpose of the present application shall fall within the scope of the patent of the present application, within the knowledge of one of ordinary skill in the art.

The invention claimed is:

1. A data processing method, applied to an application program that provides human-computer interaction based on virtual scenes, wherein the application program includes at least one subprogram, the at least one subprogram includes at least one virtual scene, the at least one virtual scene includes a first virtual scene and a second virtual scene, and the first virtual scene and the second virtual scene belong to the same or different subprograms, the data processing method includes:

a determination step: determining whether a transfer request for transferring at least one virtual character from the first virtual scene to the second virtual scene has been received;

a generation step: when the transfer request is received, generating transmission data associated with the at least one virtual character;

a transfer step: transferring the at least one virtual character from the first virtual scene to the second virtual scene on the basis of the transmission data and global data associated with the at least one virtual character; wherein:

the global data is stored in a long-term storage server, and the global data includes at least one of model information, level information, and equipment information of the at least one virtual character;

the at least one virtual character generates subprogram data when realizing human-computer interaction in the at least one virtual scene, the subprogram data is stored in one or more application servers, the subprogram data includes at least one of position parameters and motion posture parameters of the at least one virtual character;

the transmission data is generated by a jump server after extracting subprogram data required for transfer from the one or more application servers corresponding to the first virtual scene and processing it, to support the transfer of the at least one virtual character from the first virtual scene to the second virtual scene;

the global data is visible to all of the one or more application servers and supports reading and writing;

the subprogram data is only visible to an associated application server of the one or more application servers, is generated when the at least one virtual character logs in or transfers into the one or more application servers, and is destroyed when the at least one virtual character logs out or transfers out of the one or more application servers; and the transmission data is only visible to the jump server and the one or more application servers associated with this transfer process during the corresponding transfer process, after the transfer is completed, the transmission data is converted into subprogram data corresponding to the second virtual scene according to preset data rules.

2. The data processing method of claim 1, wherein:

the subprogram runs a human-computer interaction function carrying the at least one virtual scene through logical groups, each logical group is bound to a unique logical group serial number, and one or more virtual characters in the same logical group realize human-computer interaction according to a functional logic of the subprogram.

3. The data processing method of claim 2, wherein:

the number of logical groups is set according to the number of virtual characters required to be carried by each virtual scene; and the transfer step further includes matching logical groups for the virtual characters transferred to the second virtual scene according to matching rules.

4. The data processing method of claim 1, wherein the determination step further includes:

the transfer request is triggered by an interaction operation received by a preset control provided in the first virtual scene, wherein the preset control is associated with the second virtual scene.

5. A data processing system that provides human-computer interaction application program based on virtual scenes, wherein the application program includes at least one subprogram, the at least one subprogram includes at least one virtual scene, the at least one virtual scene includes a first virtual scene and a second virtual scene, the first virtual scene and the second virtual scene belong to the same or different subprograms, and each virtual scene is supported by an independent application server, including:

a first application server that provides the first virtual scene;

a second application server that provides the second virtual scene;

a jump server connected to the first application server and the second application server respectively, and storing transfer control logic;

a long-term storage server connected to the first application server and the second application server respectively, and storing global data;

wherein:

the first application server determines whether a transfer request for transferring at least one virtual character from the first virtual scene to the second virtual scene has been received;

when the first application server receives the transfer request, the jump server generates transmission data associated with the at least one virtual character, and transfers the at least one virtual character from the first virtual scene to the second virtual scene on the basis of the transmission data and global data associated with the at least one virtual character;

the at least one virtual character generates subprogram data when realizing human-computer interaction in the at least one virtual scene, the subprogram data is stored in an associated application server of the first application server and the second application server, and is only visible to the associated application server; the subprogram data is generated when the at least one virtual character logs in or transfers into the associated application server, and is destroyed when the at least one virtual character logs out or transfers out of the associated application server;

the transmission data is generated by the jump server after extracting subprogram data required for transfer from the first application server corresponding to the first virtual scene and processing it, to support the transfer of the at least one virtual character from the first virtual scene to the second virtual scene;

the transmission data is only visible to the jump server and the first application server and the second application server associated with this transfer process during the corresponding transfer process, after the transfer is completed, the transmission data is converted into subprogram data corresponding to the second virtual scene according to preset data; and the global data is visible to both the first application server and the second application server and supports reading and writing.

6. The data processing system of claim 5, wherein:

the subprogram runs a human-computer interaction function carrying the at least one virtual scene through logical groups, and each logical group is bound to a unique logical group serial number, one or more virtual characters in the same logical group realize human-computer interaction according to a functional logic of the subprogram;

the data processing system further includes:

a management server setting the number of logical groups according to the number of virtual characters required to be carried by each virtual scene;

a matching server connected to the management server and the jump server, the matching server matching logical groups for the virtual characters transferred to the second virtual scene according to matching rules.

7. The data processing system of claim 5, further including:

a user device communicatively connected with the first application server, wherein a user interacts with at least one virtual character in the first virtual scene displayed by the user device;

wherein when a preset control in the first virtual scene displayed by the user device receives an interaction operation from the user, the transfer request is sent to the first application server, wherein the preset control is associated with the second virtual scene.

* * * * *